Patented Aug. 8, 1950

2,517,904

UNITED STATES PATENT OFFICE 2,517,904

SELF-POLISHING WAX COMPOSITION

Frank H. Lyons, Memphis, Tenn., assignor to E. L. Bruce Co., Memphis, Tenn., a corporation of Delaware No Drawing. Application September 20, 1946, Serial No. 698,403

3 Claims. (Cl. 260—25)

The present invention relates to self-polishing wax compositions applied as a homogeneous liquid solution of wax-like materials, popularly applied to floors and other varnished or lacquered surfaces, but can also be applied to any other surface to which a polishing wax may desirably be applied.

Liquid wax compositions of the prior art have been of two types:

1. Wax solutions and suspensions which dry with a dull surface finish.
2. The usual self-polishing waxes of the prior art applied as an emulsion in water.

I have discovered that chlorinated waxes may be applied in homogeneous solution in solvents, which upon drying leave a high gloss wax finish. Moreover, such waxes are soluble in non-polar, as well as polar solvents allowing formulation, by selection, of solvent with respect to common varnish and lacquer coatings normally present, so as to leave these coatings unaffected by the chlorinated wax coating. For this purpose, it is generally desirable to use non-polar solvents, such as petroleum solvent predominating in aliphatic hydrocarbon content, but desirably containing some aromatic hydrocarbon. Thus, a hydrocarbon spirit solvent having a kauri-butanol number ranging from 30 to 90 is satisfactory and will not damage any usual varnish or lacquer coating on the surface to be waxed.

Waxes such as micro-crystalline paraffin, ceresine, ozokerite, beeswax, ouricury and carnauba which have been chlorinated to a chlorine content ranging from 35 to 85% have been found to give a high gloss surface film when deposited from a solvent solution. Where the wax has a considerably lower chlorine content, it is insufficiently soluble in the non-polar solvent to leave a film of adequate polish. Where the wax has a high chlorine content, somewhat variable with particular waxes, about 50 to 85% chlorine, the deposited wax film has a good gloss, but may be slightly tacky. The tackiness, when present, is overcome by the addition of a tackiness inhibitor. Various high melting organic resins that are soluble in the particular solvent, have been found to act as tackiness inhibitors. The modified phenolic resins are particularly satisfactory for this purpose. For example, when using a 70% chlorinated paraffin wax, a resinous tackiness inhibitor may be used therewith in proportion of 2 parts of resin to one of wax. It will be understood that the tackiness inhibitor is used only as needed to prevent tackiness, i. e., when the higher chlorine content renders the deposited wax tacky.

In general, the tackiness inhibitor based on the total solids content of the solution may range from 5 to 70% thereof. As noted, the tackiness inhibitor is a high melting resin usually melting over 200° F. (by the drop method) and is preferably, but not necessarily, completely polymerized.

The total solids content of the solution will vary considerably with the spraying or coating conditions. Obviously, sufficient solids must be present to give a continuous film, and if the solids content is too high, the coating will not be smooth and even. Where chlorinated wax is used alone, 15 to 30% is satisfactory. A considerably lower proportion is used when a resinous tackiness inhibitor is present, and as little as 2% is sufficient where as much as 70% of the total solid content is tackiness inhibitor.

In formulating the composition, the wax and resinous tackiness inhibitor are heated, in the solvent, with agitation, although the product can be made in the cold with longer agitation.

It will, therefore, be understood that the liquid wax compositions of the present invention are solutions of chlorinated wax in an organic solvent which latter will normally not attack, soften or dissolve ordinary varnish or lacquer finishes on the surface to be waxed. Preferably non-polar solvents are used, and depending on the chlorine content and the tackiness resulting, if any, the composition may contain a tackiness inhibitor.

The following examples illustrate the composition:

I

|  | Parts by weight |
|---|---|
| Paraffin wax (70% chlorinated) | 3⅓ |
| "Pentalyn 'M'" resin | 6⅔ |
| Aromatic petroleum solvent (kauri butanol No. 74) | 90 |

The "Pentalyn 'M'" is a phenolic modified rosin ester of pentaerythritol, a hard, brittle solid ranging in color from I to K, melting point 342° F., by the drop method, acid number less than 25, density 1.098 and index of refraction 1.455.

II

|  | Parts by weight |
|---|---|
| Chlorinated paraffin wax (55% chlorine) | 25 |
| Aromatic petroleum solvent (kauri butanol No. 60) | 90 |

III

| Chlorinated beeswax (70% chlorine) | 2½ |
|---|---|
| "Pentalyn 'M'" | 7½ |
| Aromatic petroleum solvent (K-B#74) | 90 |

Various modifications will occur to those skilled in the art and it is intended that the disclosure herein be interpreted as broadly as defined in the claims.

I claim:

1. A self-polishing wax composition comprising a solution in a volatile solvent of petroleum distillate naphtha having a substantial aromatic type hydrocarbon content and a kauri butanol number in the range of 30 to 90 containing, in quantity sufficient to form a continuous glossy film upon evaporation of the solvent, a highly chlorinated wax having a chlorine content in the range of 50 to 85% and a material adapted to inhibit inherent tackiness of said chlorinated wax consisting essentially of a wax-compatible hard resin, the said resin having a melting point generally higher than 200° F.

2. A self-polishing wax composition comprising a solution in a volatile solvent of petroleum distillate naphtha having a substantial aromatic type hydrocarbon content and a kauri butanol number in the range of 30 to 90 containing, in quantity sufficient to form a continuous glossy film upon evaporation of the solvent, a highly chlorinated wax having a chlorine content in the range of 50 to 85% and a material adapted to reduce the tackiness thereof consisting essentially of a hard brittle phenolic resin compatible with said highly chlorinated wax and soluble in said solvent and having a melting point above about 200° F.

3. A self-polishing wax comprising a volatile petroleum naphtha solvent having a kauri butanol number in the range of 30 to 90 and having dissolved therein, in quantities sufficient to form a continuous glossy film, a highly chlorinated paraffin wax having a chlorine content of approximately 70% and a material compatible therewith adapted to reduce the tackiness thereof consisting essentially of a phenolic modified penterythritol ester of rosin.

FRANK H. LYONS.

REFERENCES CITED

The following references are of record in the file of this patent:

"Diamond Chlorowax," I—Diamond Alkali Co. (pages 3–4), received Patent Office June 16, 1945.

"Diamond Chlorowax," II—Diamond Alkali Company (Advertised in Paint, Oil, and Chemical Review, Aug. 22, 1946, page 19), pages 3, 4, 12–17 and 22.